United States Patent [19]

Lagow et al.

[11] Patent Number: 4,894,484

[45] Date of Patent: Jan. 16, 1990

[54] PYROLYSIS OF PERFLUOROPOLYETHERS

[75] Inventors: Richard J. Lagow, Georgetown; Thomas R. Bierschenk; Timothy J. Juhlke, both of Roundrock; Hajimu M. Kawa, Austin, all of Tex.

[73] Assignee: Exfluor Research Corporation, Austin, Tex.

[21] Appl. No.: 92,465

[22] Filed: Sep. 3, 1987

Related U.S. Application Data

[63] Continuation-in-part of Ser. No. 796,624, Nov. 8, 1985, abandoned.

[51] Int. Cl.$^4$ ............... C07C 41/01; C07C 43/30; C07C 43/4
[52] U.S. Cl. .................... 568/615; 568/600; 568/601; 568/603; 568/604; 568/606; 562/851
[58] Field of Search ............ 568/615, 600, 601, 603, 568/604, 606; 260/543 F; 562/851

[56] References Cited

U.S. PATENT DOCUMENTS 3,242,218  3/1965  Miller .
3,847,978  11/1974  Sianesi et al. .
4,523,039  6/1985  Lagow et al. .
4,755,330  7/1988  Viola et al. .................. 568/615

FOREIGN PATENT DOCUMENTS 764110   9/1971  Belgium .
167258   1/1986  France .
1226566  3/1971  United Kingdom .

OTHER PUBLICATIONS

Gerhardt et al, J. Chem. Soc. Perkins Trans, I. 1981, pp. 1321–1328.

*Primary Examiner*—Howard T. Mars
*Attorney, Agent, or Firm*—Hamilton, Brook, Smith & Reynolds

[57] ABSTRACT

A method of breaking down perfluoropolyethers into lower molecular weight fragments by pyrolysis is disclosed. The perfluoropolyethers are pyrolyzed generally at above about 350° C. Volatile lower molecular weight components are condensed and collected. Various molecular weight fractions can be obtained by taking appropriate distillation cuts.

14 Claims, 1 Drawing Sheet

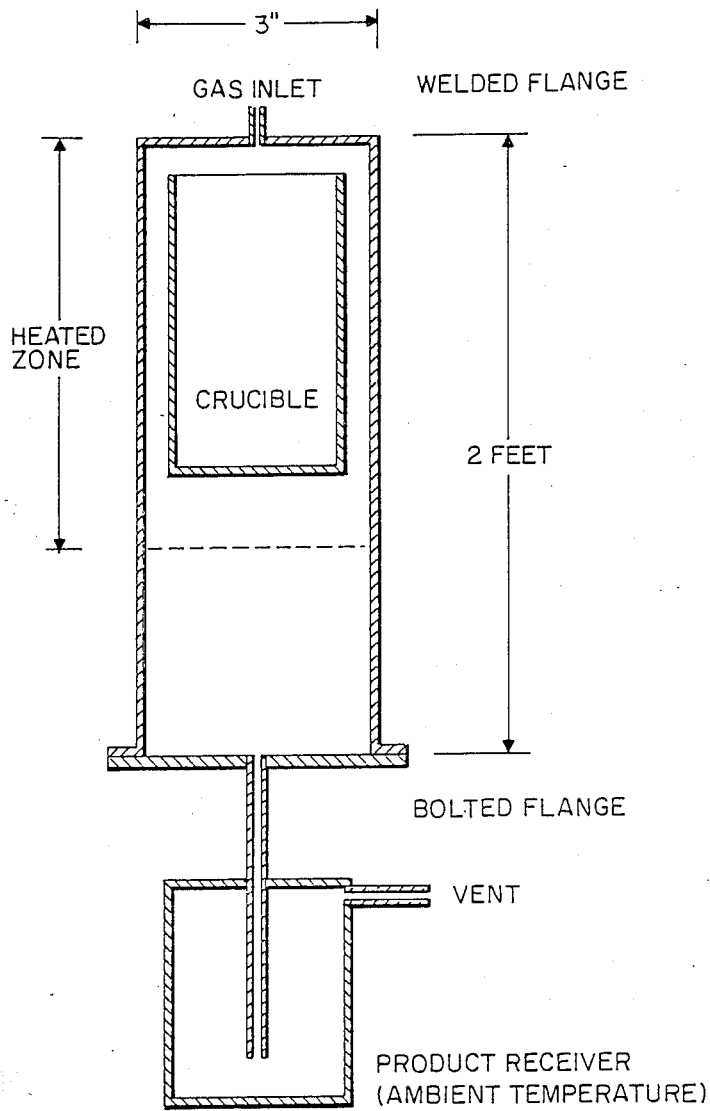
FIGURE

4,894,484

PYROLYSIS OF PERFLUOROPOLYETHERS

Related Applications

This application is a continuation-in-part application of application Ser. No. 796,624 filed Nov. 8, 1985.

FIELD OF THE INVENTION

This invention is in the fields of polymer and fluorine chemistry.

BACKGROUND

Preparation of saturated perfluoropolyethers has traditionally been limited because of the lack of versatile synthetic techniques. A successful synthesis is the polymerization of perfluoroepoxides, particularly hexafluoropropylene oxide and tetrafluoroethylene oxide. W. T. Miller, U.S. Pat. No. 3,242,218. This synthetic procedure involves a three-step scheme for production of the polymer involving oxidation of perfluoroolefins to perfluoroepoxides, followed by anionic polymerization to acyl fluoride terminated perfluoropolyethers and then replacement of the acyl fluoride end groups with perfluoroalkyl groups by decarboxylation reactions or by chain coupling photolytic decarboxylation reactions.

The procedure, however, allows little control over the molecular weight distribution of the product. Typically, a distillation cut is taken if a specific molecular weight range is needed. When tetrafluoroethylene oxide is polymerized, little if any low molecular weight fluids are obtained; the majority of the product is a higher molecular weight solid. Conversely, the polymerization of perfluoropropylene oxide gives only a liquid; no products are isolated with a sufficiently high molecular weight to be solid.

An alternate synthetic method for the production of perfluoropolyethers involves the ultraviolet photolysis of tetrafluoroethylene and/or hexafluoropropylene in an inert solvent in the presence of oxygen, D. Sianesi and R. Fontanelli, British Patent No. 1,226,566. The multistep process yields an acyl fluoride terminated polymer which contains unstable peroxidic linkages in addition to difluoromethylene oxide and tetrafluorethylene oxide (or hexafluororropylene oxide) repeating units. Treatment of the polymer at elevated temperatures and with fluorine gas gives a stable polymer containing only perfluoroalkyl end groups. Once again, it is very difficult to control the molecular weight of the polymer product. The product can be separated into various fractions based on vapor pressure.

Lagow and Gerhardt (U.S. Pat. No. 4,523,039) describe a method for preparing perfluoropolyether oligomers. The method entails prefluorination of a high molecular weight polyether followed by a fluorination of the resulting partially fluorinated polyether at elevated temperatures which results in some bond breakage as the remaining hydrogens are being replaced. An elevated temperature is chosen so that sufficient amount of bond breakage occurs. For most materials a temperature between 55° and 210° C. is preferred (see column 4, line 32). However, perfluoropolyethers (having essentially no residual hydrogen atoms) are generally stable in fluorine at temperatures within this range. See e.g., British Patent No. 1,226,566 (the Fomblin Y TM perfluoropolyethers stable in fluorine up to 320° C.); U.S. Pat. No. 3,242,218 (polytetrafluoroethylene oxide stable in fluorine at 185°-190° C.). Thus, the strategy of Lagow and Gerhardt involves a "prefluorination" period with conditions selected to maintain the structural integrity of the polymer followed by a "fragmehtation" period where the fluorination takes place at a sufficiently high temperature to cause some fragmentation as the fluorinated polymer becomes perfluorinated.

In order to obtain a narrow molecular weight distribution, the hydrogen left on the polymer following the pre-fluorination step must be randomly distributed. This is difficult to accomplish in certain instances. Material of particle sizes as small as 200 mesh are fluorinated by first adding fluorine to the surface followed by diffusion of fluorine through the fluorinated layer into the interior of the particle. The rate of reaction is limited by the rate at which the fluorine can diffuse into the interior of the particle. Upon completing the pre-fluorination phase of the reaction, each particle contains an essentially perfluorinated shell with an interior which is rich in hydrogen. The fragmentation-fluorination step has no affect on the shell which is stable in fluorine up to its thermal decomposition temperature (350° C.) while the hydrogen-rich core essentially burns. The net result is an abundance of inert solids as well as $CF_4$ and other very small fragments. In order to optimize the yield of an intermediate molecular weight fraction with commercial value one would need to fluorinate very small particles-a starting material which is generally not available.

There exists a need for a convenient means to alter the molecular weight of a perfluoropolyether polymer regardless of the method by which it is made.

DISCLOSURE OF THE INVENTION

This invention pertains to a method of cleaving perfluoropolyethers to give lower molecular weight polymers. The method comprises pyrolysis of a perfluoropolyether, condensation and collection of vaporized lower molecular weight fragments of the perfluoropolyether. The method provides a means of cleaving perfluoropolyethers (a polyether having essentially no hydrogen atoms) to produce smaller molecular weight fragments in good yield. The method can also be used to crack partially fluorinated polyethers in the absence of fluorine.

In one embodiment of the method, the pyrolysis is carried out in an apparatus which separates the high molecular weight polymer from the desired lower molecular weight fraction on the basis of vapor pressure (e.g. a distillation apparatus). The perfluoropolyether to be pyrolyzed is placed into a crucible or other vessel (pyrolysis vessel) which is located in a heating zone of the apparatus. Preferably, the apparatus has means for introduction of and exit of a gas and an inert gas is passed over the polymer throughout the procedure. The polymer is heated to pyrolysis temperature, about 350°-600° C., preferably 500°-600° C., by raising the temperature in the heating zone and the polymer is maintained at that temperature to allow low molecular weight fragments to vaporize and distill out of the pyrolysis vessel. The low molecular weight products are collected upon condensation generally in a collection vessel attached to the condensing zone of the distillation apparatus.

The pyrolysis can be carried out using a pure perfluoropolyether, generally in solid form. Additives such as select metal oxides can be added to the perfluoropolyether in order to catalytically reduce the temperature required for pyrolysis. Carbon-carbon cross-links present in the polymer to be pyrolyzed may be eliminated by adding NaOH or KOH prior to pyrolysis. These agents break the cross-links preferentially at the temperatures used (about 500°–600° C.)

The pyrolysis may be done in the presence of fluorine gas so that when the polymers are cleaved, the radicals resulting from bond breakage are capped with fluorine. Alternatively, the recovered lower molecular weight fractions may be treated with elemental fluorine after pyrolysis to ensure saturation and terminal group capping with fluorine.

BRIEF DESCRIPTION OF THE DRAWINGS

The Figure illustrates a simple apparatus for conducting the pyrolysis procedure of the invention.

BEST MODE OF THE INVENTION

The pyrolysis procedure of this invention can be carried out in a variety of apparati. A simple design is shown schematically in the Figure. It consists of a nickel tube with one removable flange (A) sealed to the reactor using an O-ring (Teflon ™ O-ring). Suspended in the chamber near the top is a nickel crucible (B) which is used to hold the perfluoropolyether which is to be pyrolyzed. A furnace (C) is placed around the nickel tube in the vicinity of the lower one-half of the crucible. A gas diluent enters through the top inlet (D) and exits along with the pyrolyzed fluid through (E). A collection vessel is attached to the bottom of the vessel to collect and hold the fluid. If fluorine is used as the pyrolysis gas, a fluorine scrubber is attached downstream from the collection vessel.

The perfluoropolyether is placed in the nickel crucible. The temperature at the bottom of the crucible is raised to about 350°–600° C., preferably 500°–600° C. and held at that temperature (the temperature at the top of the crucible can be variable depending on the location of the heater). The polymer is refluxed until a sufficient number of bonds are broken to allow the lower molecular weight fragments to distill out of the pyrolysis vessel. A stream of inert gas (e.g. nitrogen) sweeps the fragment vapors from the reactor into the collection vessel. Fluorine gas or a fluorine gas/inert gas mixture can be used in place of the inert gas as described in detail below.

Many other reactor designs can be used successfully. Virtually any type of distillation apparatus which can be heated to 500° C. preferably in the presence of fluorine gas and hydrogen fluoride, can be used. In general, a suitable apparatus comprises:

(i) a sample vessel (pyrolysis vessel) located in a heating zone;
(ii) a condensing zone;
(iii) a collection vessel connected by passageway to the condensing zone; and
(iv) means for introduction of a gas.

The pyrolysis procedure of this invention is applicable for all saturated perfluoropolyethers. This technique can be employed to crack perfluoropolyethers of any molecular weight including high molecular weight solids and low molecular weight low viscosity fluids. Because perfluoropolyethers are oxidatively stable at 500° C. and because bond breakage occurs preferentially over oxidation, inert gases, such as helium, can be used or strong oxidizers, such as oxygen, air, or fluorine, work satisfactorily.

A pyrolysis temperature of 500° C. appears to be optimal to pyrolyze approximately ½ pound of perfluoropolyether each hour (e.g. in a 3" pyrolysis tube). If the pyrolysis is carried out in fluorine, a delivery rate of approximately 1cc/min is needed for each gram pyrolyzed. The procedure can be performed at ambient pressure for most applications but it should be recognized that an increase in pressure can be used to lower the molecular weight distribution while a decrease in pressure has the opposite effect. This pressure dependence is observed since the pyrolysis products distill from the high temperature zone.

The yield obtained is a function of the molecular weight distribution. Due to the random nature of bond breakage, a loss in yield occurs only when a fragment is formed which is too small to be of any use. If the average molecular weight is known and if the lowest useable molecular weight is identified, then an approximate yield can be estimated using simple statistical methods. For example if an average molecular weight of 5000 is desired, approximately 87% of the sample will have a molecular weight above 700.

As mentioned, virtually any perfluoropolyether can be pyrolyzed to give lower molecular weight polymers by the method of this invention. For example, perfluoropoly(propylene oxide), when heated to 500° C., randomly breaks apart giving low viscosity fluids. Other examples include perfluoropoly(ethylene oxide) polymers, perfluoroethylene oxide/methyleneoxide copolymers, perfluoroethylene oxide/propylene oxide copolymers, perfluoropoly(tetramethylene oxide) and perfluoropoly(cyclohexyl oxide) polymers.

Perfluoropolyethers are chemically well suited for this reaction since they do not depolymerize by eliminating monomer units in a sequential manner as many polymers do. Additionally, perfluoropolyethers can break down completely at elevated temperatures in both an inert atmosphere and in an oxidizing atmosphere without leaving a nonvolatile residue.

Although the discussions to this point have dealt with the pyrolysis of perfluorpolyethers in a neat form, the reactions can be carried out with other materials present. For example, perfluoropolyethers prepared via direct fluorination may contain $NaHF_2$ or NaF because NaF can be added as a HF scavenger. See U.S. patent application Ser. No. 924,198, entitled "Perfluorination of Ethers in the Presence of Hydrogen Fluoride Scavengers" filed Oct. 27, 1986 (a continuation-in-part of Ser. No. 769,623 filed Nov. 8, 1985), the teachings of which are incorporated by reference herein. Mixtures containing $NaF/NaHF_2$ concentrations as high as 90% can be successfully pyrolyzed. In addition, additives such as metal fluoride (e.g. titanium fluoride and aluminum fluoride) or metal oxide (e.g. aluminum oxide) can be added to catalytically reduce the temperature required for pyrolysis. Further, sodium hydroxide or potassium hydroxide can be blended into the polymer prior to pyrolysis to improve the linearity of the fluid produced by breaking any indicental cross-links which may be present in the higher molecular weight polymer.

The pyrolysis procedure can be performed in the presence of fluorine gas. If cleavage occurs in the presence of elemental fluorine, the radicals resulting from bond breakage are capped with fluorine. The thermal cracking of perfluoropolyethylene oxide in the presence of fluorine gas primarily leads to carbon-carbon and carbon-oxygen bond cleavage. The carbon-carbon bond, being the weaker of the two, is broken preferentially as illustrated by the following equations:

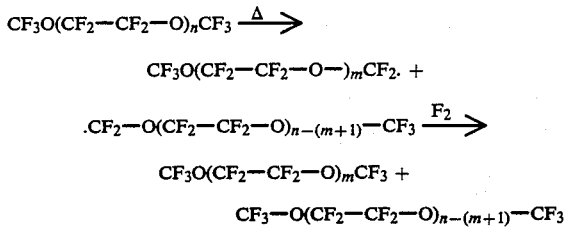

If carbon-oxygen bond is broken, an unstable acyl fluoride is formed which decomposes to give a perfluoro-alkyl terminal group as depicted by the following reaction sequence:

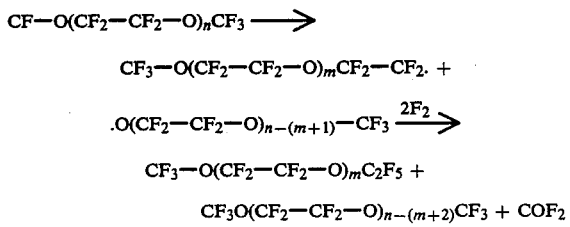

It is often desirable to carry out the pyrolysis in an inert atmosphere to avoid having to handle hot fluorine gas. This can be done successfully and usually results in acyl fluoride terminated polymers which contain a slight degree of unsaturation resulting in very slight discolorations. The acyl fluoride end groups and unsaturation can be easily eliminated by treatment of the polymer with fluorine gas at 110° C. after pyrolysis.

The method of this invention has several important advantages.

(1) The temperature affects the rate of fragmentation and not the molecular weight of the fragments. Thus, the process can be performed quickly without reduction of fragment size.
(2) A narrow molecular weight distribution can be obtained where $CF_4$ constitutes less than 5% of the product and the amount of solid is essentially 0%.
(3) The distribution of the molecular weight is easily altered in a reproducible manner by simply changing the pressure in the pyrolysis reactor.
(4) For many solid perfluoropolyethers the process can be performed in 1 to 3 hours to give oils in about an 80% yield.

These results are surprising since perfluoropolymers like polytetrafluoroethylene are known to decompose by end-initiated unzipping. Thus, trifluoroacetyl fluoride could be expected as the primary product in the case of perfluoroethers. Instead, perfluoropolyethers appear to thermally degrade by random bond breakages giving rise to large fragments.

The invention is illustrated further by the following example.

EXAMPLE 1

The nickel crucible shown in the FIGURE was filled with 700g of perfluoropolyethylene oxide solids. The crucible (nickel tube, outside diameter 2½ inches, length 12 inches) was placed in the nickel pyrolysis tube (outside diameter, 3 inches; length 2 feet) and was purged with several volumes of nitrogen prior to heating. The crucible was heated to the pyrolysis temperature (500° C.) over a two hour period and was maintained at that temperature for approximately three hours to ensure that all of the polymer is thermally cracked. The lower molecular weight fragments distilled out of the crucible which was held at a temperature of approximately 350° C. at the top. A purge of nitrogen (50 cc/min) through the pyrolysis tube swept the oil vapors from the reactor into a collection vessel. 609 g of a light oil was collected (87% yield) which was slightly discolored and contained some acyl fluoride terminal groups. Treatment of the oil with pure fluorine at 110° C. in an ambient pressure reactor gave 581 g of a clear, nonreactive, light oil (overall yield of 83%).

EXAMPLE 2

The apparatus of Example 1 was charged with 650 g of a medium viscosity perfluoropolyethylene oxide fluid (viscosity at 100° F. was approximately 100 centistokes). The crucible was placed in the nickel pyrolysis tube which was purged with several volumes of nitrogen and pressured with 250 psi of nitrogen. A nitrogen purge through the pressurized vessel was maintained as the crucible was heated to the pyrolysis temperature (500°–600° C.). This temperature was maintained for approximately 3 hours which allowed the lower molecular weight fragments to distill out of the crucible and into a collection vessel as they were produced. Approximately 580 g of a light oil was recovered having a viscosity of 15–20 centistokes at 100° F.

EXAMPLE 3

The apparatus of Example I was filled with 725 g of a perfluorinated 70:30 ethylene oxide:propylene oxide copolymer. The crucible was placed in the nickel pyrolysis tube, was loaded in the pyrolysis apparatus, and was purged with several volumes of nitrogen prior to heating to 500° C. The lower molecular weight fragments distilled out of the reactor as they were produced giving rise to 630 g of a pale yellow oil which contained some acyl fluoride terminal groups. Titration of the oil with a 1 molar NaOH solution (phenothalein end point) showed that approximately 25% of the terminal groups were reactive acyl fluoride groups. Treatment of the oil at 110° C. in pure fluorine gave 610 g of a clear, chemically inert, light oil which was shown to be a perfluoro(ethylene oxide-propylene oxide) copolymer by $^{19}F$ nmr.

EXAMPLE 4

Approximately 500 g of perfluoropropylene oxide solids (prepared by direct fluorination of propylene oxide) were placed in a nickel crucible which was positioned in the nickel pyrolysis vessel depicted in Figure I. Following purging with several volumes of nitrogen, the apparatus was heated to 500° C. over a 2 hour period and was maintained at that temperature for approximately 3 hours as the solids were thermally cracked. The lower molecular weight fragments distilled out of the crucible which was held at a temperature of approximately 350° C. at the top. Approximately 430 g of a yellow oil was recovered in the collection vessel. Treatment of the fluid with pure fluorine for several hours (110° C.) gave a medium viscosity fluid with a $^{19}F$ nmr indistinguishable from that of a Krytox ™ fluid with a comparable viscosity. (Krytox is the trademark of a perfluoropolyether fluid based on hexafluoropropylene oxide which is marketed by Du Pont).

EXAMPLE 5

Approximately 475 g of a 1:1 copolymer of difluoroethylene oxide and tetrafluoroethylene oxide prepared by fluorinating polydioxolane was placed in the nickel crucible which was positioned in the nickel pyrolysis vessel shown in FIG. 1. The apparatus was purged with several volumes of nitrogen then heated to 500° C. over a 2 hr. period. The pyrolysis reactor was allowed to cool after 2.5 hrs. at 500° C., was opened and residue remaining in the vessel was weighed. Less than 1 g of solid residue was left while 380 g of a dark yellow oil was recovered in the collection vessel. Treatment of the fluid with 50% fluorine at 250° C. for several hrs. gave a low viscosity fluid which was shown by $^{19}$F NMR to have a structure consistent with the formula $(CF_2CF_2OCF_2O)_m$.

Industrial Applicability

Perfluoropolyether fluids, due to their extreme stability and chemical inertness, are useful for many applications such as hydraulic fluids, solvents, lubricants, sealants, etc. However, their uses are currently numbered due to synthetic limitations which prevent the preparation of a fluid with the proper molecular weight distribution. The pyrolysis method of this invention can be used to produce low molecular perfluoropolyether fluids from high molecular weight solids (or fluids). By incorporating this pyrolysis technology with existing polymerization or direct fluorination technologies for producing perfluoropolyethers, essentially all molecular weight ranges of perfluoro polyethers can be made in fairly high yields.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. A method of cleaving perfluoropolyethers to lower molecular weight fragments, comprising the steps of:
    (a) providing a perfluoropolyether selected from the group consisting of perfluoropoly(ethylene oxide), perfluoropolypropylene oxide, perfluoroethylene oxide/methylene oxide/copolymers, perfluoroethylene oxide/propylene oxide copolymers, perfluoropoly(tetramethylene oxide) and perfluoropoly(cyclohexyl oxide);
    (b) pyrolyzing the perfluoropolyether at a temperature above about 350° C. to cleave the perfluoropolyether into lower molecular weight perfluoropolyethers in the absence of a metal oxide or metal fluoride catalyst; and
    (c) condensing and collecting lower molecular weight perfluoropolyethers.

2. A method of claim 1, further comprising the step of:
    d. treating the collected perfluoropolyethers with fluorine gas to eliminate acyl fluoride end groups and any unsaturation of the collected perfluoropolyethers.

3. A method of claim 1, wherein the perfluoropolyether is pyrolyzed in the presence of an inert gas.

4. A method of claim 1, wherein the perfluoropolyether is pyrolyzed in the presence of fluorine gas or a mixture of inert gas and fluorine gas.

5. A method of claim 1, wherein the pyrolysis is performed at ambient pressure.

6. A method of claim 1, wherein the pyrolysis is performed at a pressure above ambient pressure to produce perfluoropolyether fragments of a lower average molecular weight than those produced at ambient pressure.

7. A method of claim 1, wherein the pyrolysis is performed at a pressure below ambient pressure to produce perfluoropolyether fragments of a higher average molecular weight than those produced at ambient pressure.

8. A method of claim 1 wherein the lower molecular perfluoropolyether of step c is linear.

9. A method of breaking down perfluoropolyethers into lower molecular weight polymers, comprising the steps of:
    (a) providing a distillation apparatus comprising:
        (i) a sample vessel located in a heating zone;
        (ii) a condensing zone;
        (iii) a collection vessel connected by passageway to the condensing zone; and
        (iv) means for introduction of a gas;
    (b) placing a perfluoropolyether in the sample vessel wherein the perfluoropolyether is selected from the group consisting of perfluoropoly(ethylene oxide), perfluoropolypropylene oxide, perfluoroethylene oxide/methylene oxide/ copolymers, perfluoroethylene oxide/propylene oxide copolymers, perfluoropoly(tetramethylene oxide) and perfluoropoly(cyclohexyl oxide);
    (c) establishing a flow of inert gas into the apparatus;
    (d) heating the perfluoropolyether by raising the temperature of the heating zone to above 350° C. in the absence of a metal oxide or metal fluoride catalyst;
    (e) maintaining the temperature in the heating zone to vaporize the lower molecular weight fragment of the perfluoropolyether; and
    (f) collecting condensed lower molecular weight fragments of the perfluoropolyether.

10. A method of cleaving perfluoropolyether solids to produce perfluoropolyether oils, comprising the steps of:
    (a) providing a solid perfluoropolyether selected from the group consisting of perfluoropoly(ethylene oxide), perfluoropolypropylene oxide, perfluoroethylene oxide/methylene oxide/copolymers, perfluoroethylene oxide/propylene oxide copolymers, perfluoropoly(tetramethylene oxide) and perfluoropoly(cyclohexyl oxide);
    (b) heating the solid perfluoropolyether to a temperature above about 350° C. for a period of time sufficient to cleave the perfluoropolyether into lower molecular weight fragments in the absence of a metal oxide or metal fluoride catalyst; and
    (c) condensing and collecting vaporized lower molecular weight fragments to obtain an oil.

11. A method of cleaving perfluoropolyethers to lower molecular weight fragments, comprising the steps of:
    (a) providing a perfluoropolyether selected from the group consisting of perfluoropoly(ethylene oxide), perfluoropolypropylene oxide, perfluoroethylene oxide/methylene oxide/copolymers, perfluoroethylene oxide/propylene oxide copolymers, perfluoropoly(tetramethylene oxide) and perfluoropoly(cyclohexyl oxide);
(b) pyrolyzing the perfluoropolyether at a temperature from about 500° C.-600° C. to cleave the perfluoropolyether into lower molecular weight perfluoropolyethers; and
(c) condensing and collecting lower molecular weight perfluoropolyethers.

12. A method of breaking down perfluoropolyethers into lower molecular weight polymers, comprising the steps of:
(a) providing a distillation apparatus comprising:
 (i) a sample vessel located in a heating zone;
 (ii) a condensing zone;
  (iii) a collection vessel connected by passageway to the condensing zone; and
  (iv) means for introduction of a gas;
(b) placing a perfluoropolyether in the sample vessel wherein the perfluoropolyether is selected from the group consisting of perfluoropoly(ethylene oxide), perfluoropolypropylene oxide, perfluoroethylene oxide/methylene oxide/ copolymers, perfluoroethylene oxide/propylene oxide copolymers, perfluoropoly(tetramethylene oxide) and perfluoropoly(cyclohexyl oxide);
(c) establishing a flow of inert gas into the apparatus;
(d) heating the perfluoropolyether by raising the temperature of the heating zone from about 500° C.-600° C.;
(e) maintaining the temperature in the heating zone to vaporize the lower molecular weight fragment of the perfluoropolyether; and
(f) collecting condensed lower molecular weight fragments of the perfluoropolyether.

13. A method of cleaving perfluoropolyether solids to produce perfluoropolyether oils, comprising the steps of:
(a) providing a solid perfluoropolyether selected from the group consisting of perfluoropoly(ethylene oxide), perfluoropolypropylene oxide, perfluoroethylene oxide/methylene oxide/copolymers, perfluoroethylene oxide/propylene oxide copolymers, perfluoropoly(tetramethylene oxide) and perfluoropoly(cyclohexyl oxide);
(b) heating the solid perfluoropolyether to a temperature from about 500° C.-600° C. for a period of time sufficient to cleave the perfluoropolyether into lower molecular weight fragments; and
(c) condensing and collecting vaporized lower molecular weight fragments to obtain an oil.

14. A method of claim 9, further comprising the step of:
g. treating the collected perfluoropolyethers with fluorine gas to eliminate acyl fluoride end groups and any unsaturation of the collected perfluoropolyethers.

* * * * *